United States Patent
Chen et al.

(10) Patent No.: US 7,742,271 B2
(45) Date of Patent: Jun. 22, 2010

(54) APPARATUS AND SURGE PROTECTING CIRCUIT THEREOF

(75) Inventors: Yu-Cheng Chen, Taoyuan Hsien (TW); Yun-Teng Shih, Taoyuan Hsien (TW); Ming-Fa Wu, Taoyuan Hsien (TW); Han-Cheng Hsu, Taoyuan Hsien (TW)

(73) Assignee: Delta Networks, Inc., Taipei, Taiwan (CN)

( * ) Notice: Subject to any disclaimer, the term of this patent is extended or adjusted under 35 U.S.C. 154(b) by 0 days.

(21) Appl. No.: 11/949,524

(22) Filed: Dec. 3, 2007

(65) Prior Publication Data

US 2008/0137242 A1 Jun. 12, 2008

(30) Foreign Application Priority Data

Dec. 8, 2006 (TW) ............................... 95145990 A

(51) Int. Cl.
*H02H 1/04* (2006.01)
*H02H 9/00* (2006.01)
(52) U.S. Cl. ...................................................... 361/119
(58) Field of Classification Search .................. 361/119
See application file for complete search history.

(56) References Cited

U.S. PATENT DOCUMENTS

| | | | | |
|---|---|---|---|---|
| 4,021,760 A | * | 5/1977 | Campi | 333/167 |
| 4,110,570 A | * | 8/1978 | Foster | 340/425.2 |
| 4,309,641 A | * | 1/1982 | Shepherd | 315/408 |
| 4,355,352 A | * | 10/1982 | Bloom et al. | 363/16 |
| 5,852,558 A | * | 12/1998 | Julian et al. | 363/132 |
| 6,747,859 B2 | * | 6/2004 | Walbeck et al. | 361/93.1 |
| 7,136,270 B2 | * | 11/2006 | Liebenow | 361/118 |
| 2002/0109585 A1 | * | 8/2002 | Sanderson | 340/310.01 |
| 2003/0072121 A1 | * | 4/2003 | Bartel et al. | 361/119 |
| 2004/0145849 A1 | * | 7/2004 | Chang et al. | 361/120 |
| 2005/0007241 A1 | * | 1/2005 | Kline et al. | 340/310.01 |
| 2005/0088792 A1 | * | 4/2005 | Mechanic et al. | 361/91.1 |

* cited by examiner

*Primary Examiner*—Ronald W Leja
(74) *Attorney, Agent, or Firm*—Birch, Stewart, Kolasch & Birch, LLP

(57) ABSTRACT

A HomePlug apparatus is electrically connected to a power network and includes a HomePlug processing circuit and a surge protecting circuit. The HomePlug processing circuit is electrically connected to the surge protecting circuit. The surge protecting circuit has at least one inductor, at least one capacitor and at least one arrester. The inductor is electrically connected to the power network. The arrester is electrically connected to a ground. The inductor, the capacitor and the arrester are connected in series to guide a surge originated from the power network to the ground.

19 Claims, 3 Drawing Sheets

APPARATUS AND SURGE PROTECTING CIRCUIT THEREOF

CROSS REFERENCE TO RELATED APPLICATIONS

This Non-provisional application claims priority under 35 U.S.C. §119(a) on Patent Application No(s). 095145990 filed in Taiwan, Republic of China on Dec. 8, 2006, the entire contents of which are hereby incorporated by reference.

BACKGROUND OF THE INVENTION

1. Field of Invention

The invention relates to a network apparatus and, in particular, to a power network apparatus.

2. Related Art

The HomePlug apparatus is a network apparatus. The terminals of the HomePlug apparatus communicate with each other through power lines for supplying power, and data transmission is performed through the power lines. Thus, the trouble of arranging network wires and layout can be avoided at homes, schools, and companies.

Because noise exists on the power lines, the carrier sense multiple access with collision avoidance (CSMA/CA) of IEEE 802.11 serves as the media access method and the frequency band (from 4.3 to 20.9 MHz) with the less noise on the power lines is used for the data transmission in a power network. In addition, the power network increases the transmission speed and the ability against the interference by the way of orthogonal frequency division multiplexing (OFDM) modulation.

Generally speaking, the power lines may have a surge generated due to the factor such as a thunderbolt or interference. In order to prevent the impact caused by the surge, a surge protecting circuit is usually provided to absorb the surge.

Referring to FIG. 1, a conventional power network apparatus 1 includes a power network processing circuit 11, two capacitors 12 and 13 and an arrester 14. The power network processing circuit 11 is electrically connected to a power network 2 to receive/transmit an information signal, and demodulate/modulate or decode/encode the information signal so as to reproduce a data signal from the information signal or to mix the data signal into the information signal. The power network apparatus 1 may provide the data signal to a computer, a digital home appliance or a calculator apparatus.

The capacitors 12 and 13 and the arrester 14 serve as a surge protecting circuit and are disposed between the power network processing circuit 11 and the power network 2. The first ends of the capacitors 12 and 13 are electrically connected to a node S, and the second ends of the capacitors 12 and 13 are electrically connected to two ends of the power network 2, respectively. One end of the arrester 14 is electrically connected to the node S and the other end thereof is electrically connected to the ground. The surge on the power network 2 may be properly buffered and guided to the ground through the capacitor 12 and the arrester 14 or through the capacitor 13 and the arrester 14. Thus, it is possible to prevent the surge from being inputted to the power network processing circuit 11 to damage the circuit.

Under this architecture, however, the capacitors 12 and 13 may absorb the information signal on the power network processing circuit 11 and the power network 2 so that the intensity of the information signal is attenuated and the data transmission rate is decreased and the data transmission quality is influenced.

Therefore, it is an important subject to provide a power network apparatus capable of preventing the above-mentioned problems from happening and improving the above-mentioned drawbacks.

SUMMARY OF THE INVENTION

In view of the foregoing, the invention is to provide a power network apparatus, which has a surge protecting circuit and is capable of reducing the attenuation of an information signal.

To achieve the above, the invention discloses a power network apparatus electrically connected to a power network. The power network apparatus includes a power network processing circuit and a surge protecting circuit. The power network processing circuit is electrically connected to the surge protecting circuit, which has at least one inductor, at least one capacitor and at least one arrester. The inductor is electrically connected to the power network. The arrester is electrically connected to a ground. The inductor, the capacitor and the arrester are connected in series to guide a surge originated from the power network to the ground.

To achieve the above, the invention also discloses a surge protecting circuit electrically connected to a power network and a power network processing circuit. The surge protecting circuit includes at least one inductor, at least one capacitor and at least one arrester. The inductor is electrically connected to the power network. The arrester is electrically connected to a ground. The inductor, the capacitor and the arrester are connected in series to guide a surge originated from the power network to the ground.

As mentioned hereinabove, the surge protecting circuit has the capacitor and the arrester and further has the inductor in the power network apparatus according to the invention. The inductor, the capacitor and the arrester are connected in series and then grounded. Thus, the surge on the power network may also be guided to the ground through the surge protecting circuit so as to protect the power network processing circuit from being impacted by the surge. In addition, since the inductor has the property of the high impedance relative to the signal of the power network. Thus, it is possible to prevent the drawback that the surge protecting circuit absorbs the signal of the power network.

BRIEF DESCRIPTION OF THE DRAWINGS

The invention will become more fully understood from the detailed description given herein below illustration only, and thus is not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
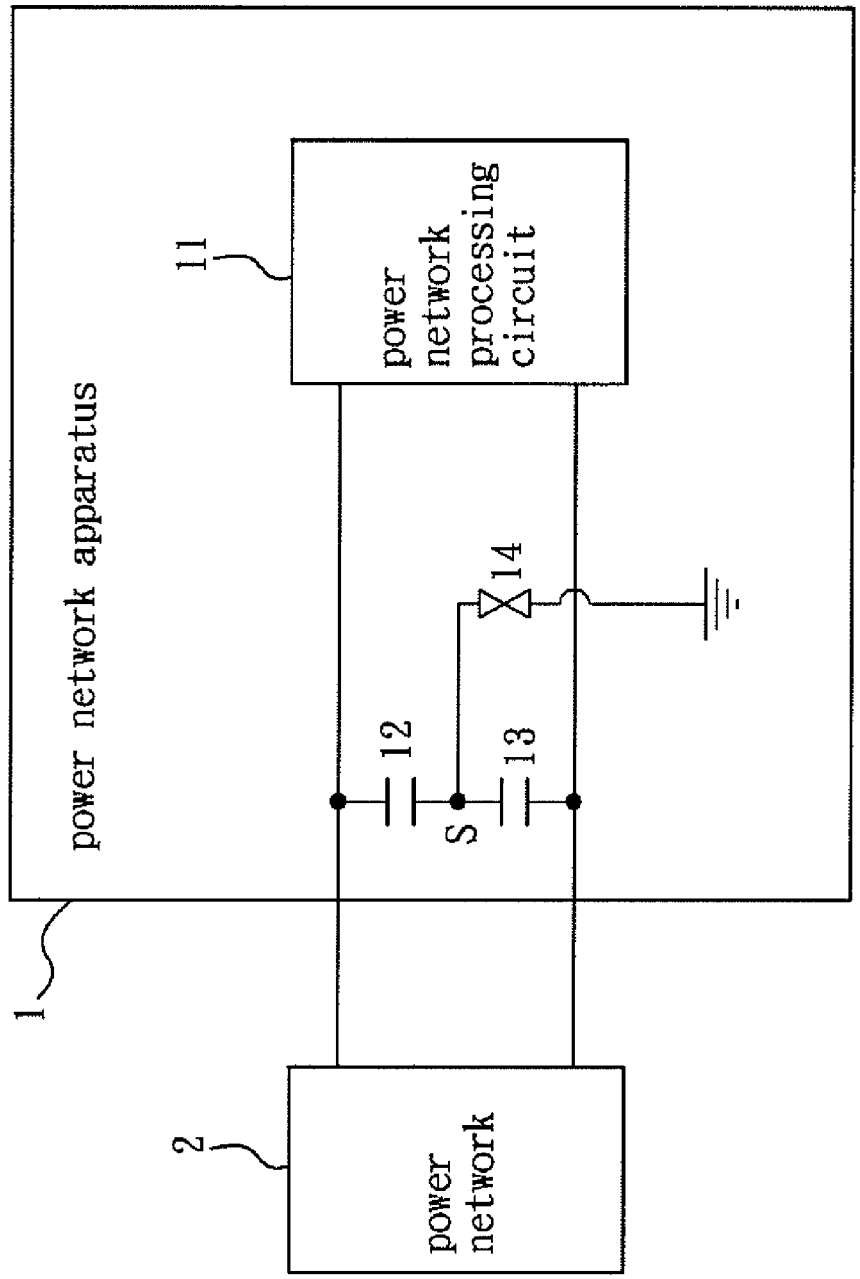
FIG. 1 is a schematic illustration showing a conventional power network apparatus.
Figure 2:
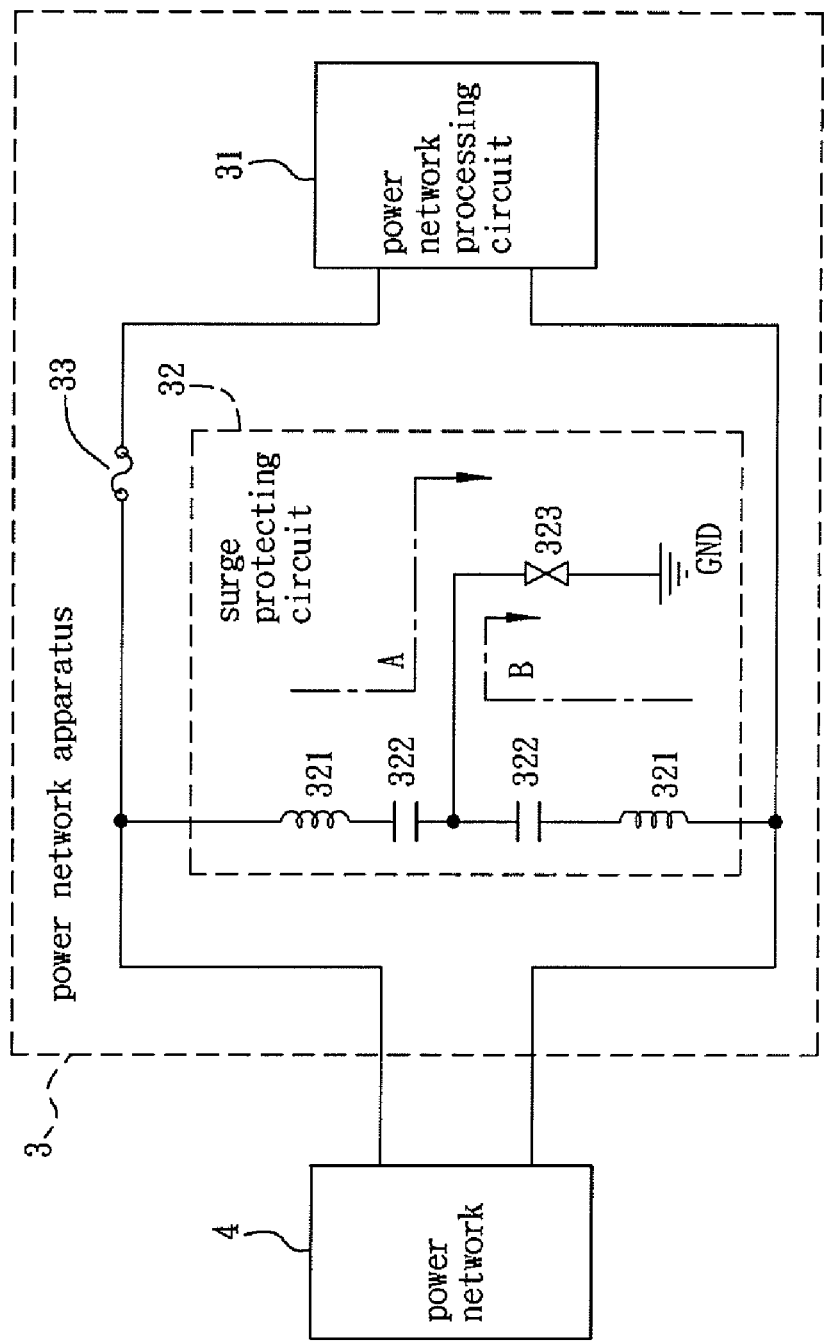
FIG. 2 is a schematic illustration showing a power network apparatus according to an embodiment of the invention.

Referring to FIG. 2, a power network apparatus 3 according to the preferred embodiment of the invention is electrically connected to a power network 4 and includes a power network processing circuit 31 and a surge protecting circuit 32. The power network processing circuit 31 is electrically connected to the surge protecting circuit 32.

An information signal is transmitted between the power network 4 and the power network processing circuit 31. The power network processing circuit 31 is electrically connected to the power network 4 to receive/transmit the information signal and to demodulate/modulate or decode/encode the information signal. Thus, a data signal may be reproduced from the information signal or may be mixed into the information signal.

The surge protecting circuit 32 has at least one inductor 321, at least one capacitor 322 and at least one arrester 323. The inductor 321 is electrically connected to the power network 4. The arrester 323 is electrically connected to a ground end GND. The inductor 321, the capacitor 322 and the arrester 323 are connected in series to guide a surge originated from the power network 4 to the ground end GND.

The inductor 321 has the property of the high impedance relative to the signal of the power network 4, the information signal will not be coupled to the inductor 321, and the inductor 321 isolates the capacitor 322 from the power network 4. Therefore, the capacitor 322 also cannot absorb the information signal and it is thus possible to prevent the surge protecting circuit 32 from absorbing the signal of the power network 4.

In addition, the power network 4 usually provides the AC power and has electric lines including a fire line and a neutral line (ground line) to provide the power for the electronic apparatus. In this embodiment, the surge protecting circuit 32 has two inductors 321 and two capacitors 322. The inductors 321 are respectively connected to two ends of the power network 4. The inductors 321 and the capacitors 322 are connected in series and between the two ends of the power network 4. One end of the arrester 323 is electrically connected to the capacitors 322. The other end of the arrester 323 is electrically connected to the ground end GND.

The inductor 321, the capacitor 322 and the arrester 323 on each of the paths A and B are connected in series. Thus, the surge generated at one of the ends of the power network 4 may be guided to the ground end GND through the path A or B so that the surge cannot be inputted to the power network processing circuit 31.

In addition, the power network apparatus 3 further includes a circuit breaker 33 which may be a fuse or a safety switch. The circuit breaker 33 is connected to and between the power network 4 and the power network processing circuit 31. Under the normal condition, the circuit breaker 33 electrically connects the power network 4 to the power network processing circuit 31 to cause the power network 4 and the power network processing circuit 31 to keep operating normally. If the power network 4 generates the surge, the circuit breaker 33 is cut off to isolate the power network processing circuit 31 from the power network 4.

Under this architecture, the inductance of the inductors 321 has to be sufficient high in order to prevent the information signal from being coupled to the surge protecting circuit 32 and thus to isolate the capacitors 322 from the power network 4. The preferred inductance of each of the inductors 321 is higher than about 100 μH, for example.

Figure 3:
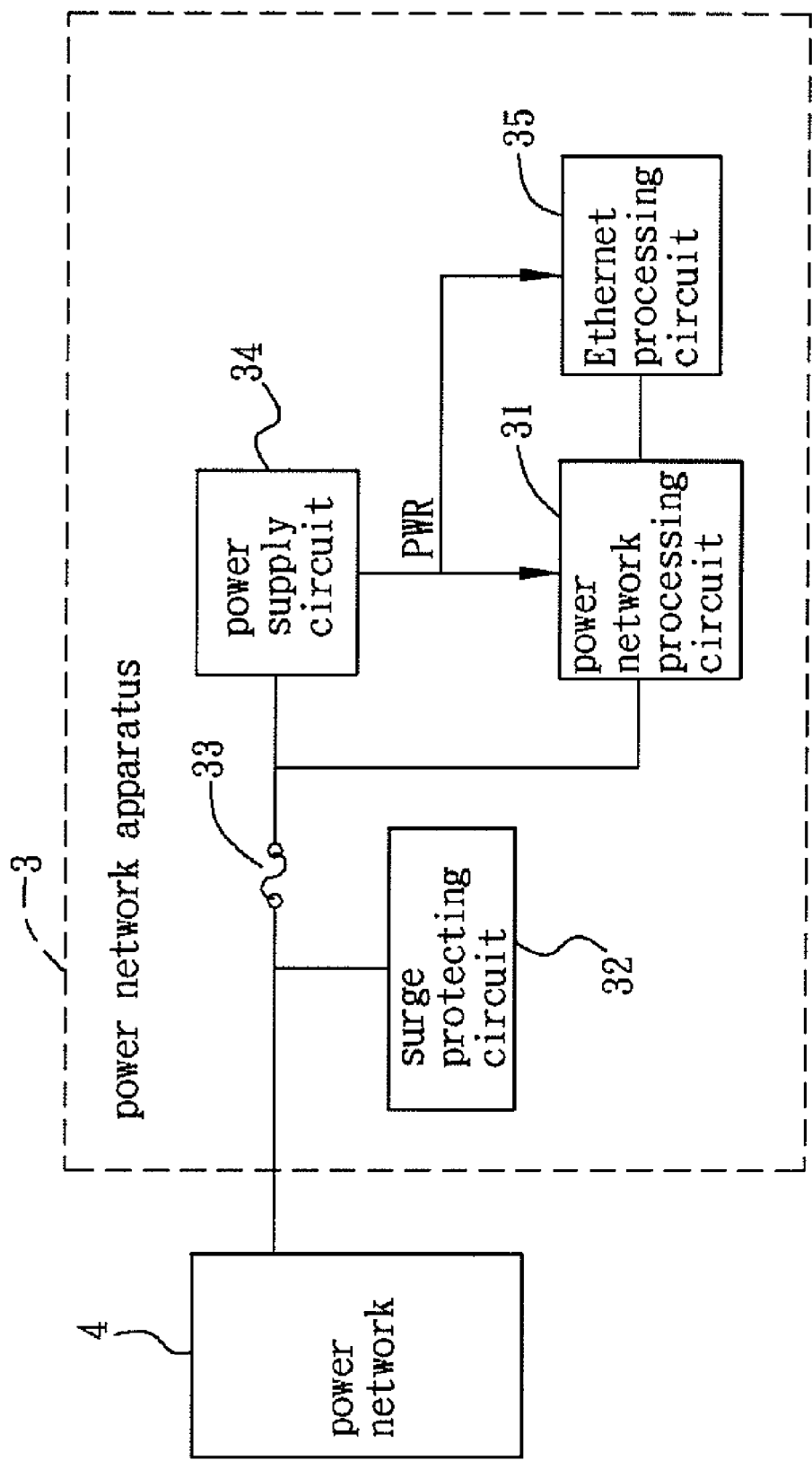
FIG. 3 is a schematic illustration showing another power network apparatus according to the embodiment of the invention.

Referring to FIG. 3, another power network apparatus 3 of the invention further includes a power supply circuit 34 and an Ethernet processing circuit 35.

The power supply circuit 34 is electrically connected to the power network 4 to output a power signal PWR to the power network processing circuit 31 and the Ethernet processing circuit 35. Typically, the power supply circuit 34 converts an AC power signal inputted from the power network 4 into a DC power signal, lowers down the voltage of the DC power signal, and then outputs the DC power signal PWR having the voltage of 12, 3.3 or 1.2 volts, for example.

The Ethernet processing circuit 35 is electrically connected to the power network processing circuit 31, reproduces the data signal having an Ethernet format into a reproduced signal and transmits the reproduced signal to the power network processing circuit 31, or converts a data signal received from the power network processing circuit 31 into a signal having the Ethernet format. The Ethernet processing circuit 35 may be connected to a computer, a digital home appliance or a calculator apparatus through the Ethernet, and may provide the data signal to these apparatuses, or may obtain the data signal from these apparatuses.

In addition, the power network apparatus 3 may be connected to other calculator apparatuses for communicating through other interfaces exclusive of the Ethernet. In another embodiment, the Ethernet processing circuit 35 may be replaced with a processing circuit with the specification of USB, IEEE 1394, bluetooth, WiFi, WiMax, cable communication, wireless communication or the like. That is, the power network apparatus 3 may communicate with other electronic apparatuses through the wired or wireless communication protocol.

The invention also provides a surge protecting circuit 32 electrically connected to the power network 4 and the power network processing circuit 31. The surge protecting circuit 32 comprises at least one inductor 321, at least one capacitor 322 and at least one arrester 333. The constitution, function and implementation of the inductor 321, the capacitor 322 and the arrester 333 are the same as those mentioned hereinabove, so detailed descriptions thereof will be omitted.

In summary, the surge protecting circuit has the capacitor and the arrester and further has the inductor in the power network apparatus according to the invention. The inductor, the capacitor and the arrester are connected in series and then grounded. Thus, the surge on the power network may also be guided to the ground through the surge protecting circuit so as to protect the power network processing circuit from being impacted by the surge. In addition, since the inductor has the property of the high impedance relative to the information signal of the power network. Thus, it is possible to prevent the drawback that the surge protecting circuit absorbs the information signal of the power network.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A power network apparatus connected to a power network, comprising:

a surge protecting circuit having at least one inductor, at least one capacitor and at least one arrester, wherein the inductor is electrically connected to the power network, the capacitor has a first end electrically connected to the inductor and a second end electrically connected to the arrester, the arrester is electrically connected to a ground, and the inductor, the capacitor and the arrester are connected for guiding a surge from the power network to the ground;

a power network processing circuit electrically connected to the surge protecting circuit; and a power supply circuit electrically connected to the power network and outputting a DC power signal to the power network processing circuit.

2. The power network apparatus according to claim 1, wherein the surge protecting circuit comprises two inductors and two capacitors, the inductors and the capacitors are connected in series, and the inductors are respectively electrically connected to two ends of the power network.

3. The power network apparatus according to claim 2, wherein the arrester has one end connected to the capacitors and the other end connected to the ground.

4. The power network apparatus according to claim 1, wherein the power network is AC power.

5. The power network apparatus according to claim 1, further comprising:
a circuit breaker connected between the power network and the power network processing circuit.

6. The power network apparatus according to claim 5, wherein the circuit breaker is a fuse or a safety switch.

7. The power network apparatus according to claim 1, wherein an information signal is transmitted between the power network and the power network processing circuit.

8. The power network apparatus according to claim 7, wherein the power network processing circuit modulates/demodulates or encodes/decodes the information signal.

9. The power network apparatus according to claim 7, wherein the inductor isolates the capacitor from the power network to prevent the capacitor from absorbing the information signal.

10. The power network apparatus according to claim 1, further comprising:
an Ethernet processing circuit electrically connected to the power network processing circuit for transmitting a data signal reproduced in an Ethernet format to the power network processing circuit, or converting a data signal received by the power network processing circuit into the Ethernet format.

11. The power network apparatus according to claim 1, wherein the power network apparatus communicates with an electronic apparatus via USB, IEEE 1394, Ethernet, bluetooth, WiFly, WiMax, cable communication or wireless communication.

12. The power network apparatus according to claim 1, wherein the inductor, the capacitor and the arrester are connected in series.

13. A surge protecting circuit, electrically connected to a power network and a power network processing circuit, comprising at least one inductor, at least one capacitor, at least one arrester, and a power supply circuit electrically connected to the power network and outputting a DC power signal to the power network processing circuit, wherein the inductor is electrically connected to the power network, the capacitor has a first end electrically connected to the inductor and a second end electrically connected to the arrester, the arrester is electrically connected to a ground, and the inductor, the capacitor and the arrester are connected for guiding a surge from the power network to the ground.

14. The surge protecting circuit according to claim 13, wherein the surge protecting circuit comprises two inductors and two capacitors, the inductors and the capacitors are connected in series, and the inductors are respectively electrically connected to two ends of the power network.

15. The surge protecting circuit according to claim 14, wherein the arrester has one end connected to the capacitors and the other end connected to the ground.

16. The surge protecting circuit according to claim 13, wherein an information signal is transmitted between the power network and the power network processing circuit.

17. The surge protecting circuit according to claim 16, wherein the power network processing circuit modulates/demodulates or encodes/decodes the information signal.

18. The surge protecting circuit according to claim 16, wherein the inductor isolates the capacitor from the power network to prevent the capacitor from absorbing the information signal.

19. The surge protecting circuit according to claim 13, wherein the inductor, the capacitor and the arrester are connected in series.

* * * * *